Patented Apr. 12, 1932

1,853,522

UNITED STATES PATENT OFFICE

LEROY C. STEWART, OF MIDLAND, MICHIGAN, ASSIGNOR TO THE DOW CHEMICAL COMPANY, OF MIDLAND, MICHIGAN, A CORPORATION OF MICHIGAN

MAGNESIA CEMENT COMPOSITION

No Drawing.   Application filed October 22, 1929.   Serial No. 401,613.

My invention relates to plastic compositions of the type broadly described as magnesia cements, and more particularly to such compositions wherein the principal active ingredients are magnesia, magnesium sulphate and water, together with smaller amounts of certain beneficial substances which impart added strength and other desirable properties thereto.

Magnesia cements composed of magnesia, magnesium chloride and water, with or without smaller amounts of other active ingredients, and an inert filler are well known and extensively used. Such cements are most often referred to as "oxychloride" cements. Similar compositions wherein magnesium sulphate replaces the chloride, and denominated "oxysulphate" cements, are less well known, but they have been proposed by reason of certain advantages expected to accrue from the use of a less hygroscopic material than magnesium chloride. The latter has a strong attraction for moisture, consequently cements containing it absorb moisture from the air in greater or less amount depending upon humidity and other controlling factors. For many purposes the characteristic just mentioned is a disadvantage, in some cases even prohibiting the use of oxychloride cements where otherwise their properties are entirely suitable for the particular use in question. To avoid this difficulty, it has been sought to use magnesium sulphate, which is non-hygroscopic, in place of the chloride for purposes wherein the aforementioned disability of the oxychloride cement precludes its use. Such oxysulphate cements, however, when compounded with the primary ingredients magnesia, magnesium sulphate, water and filler alone, are relatively weak as compared with the oxychloride cements. Further, the oxysulphate cements suffer from the, for many purposes, even more serious defect that upon immersion in water their strength is much more severely diminished than in the case of the oxychloride cements, and upon again drying out such strength is only partially recovered, whereas in an oxychloride cement the original strength is usually fully recovered, and, in fact, may often be exceeded.

To illustrate this phenomenon more particularly, reference may be made to the accompanying Table I, which gives the wet, dry and "recovered" strengths, respectively, for a representative oxychloride and oxysulphate cement.

Table I

|  | Modulus of rupture— lb./sq. in. | | |
| --- | --- | --- | --- |
|  | Wet | Dry | "Recovered" |
| Oxychloride | 663 | 1362 | 1500 |
| Oxysulphate | 236 | 1129 | 480 |

In the above examples the same materials were used in mixing the batches, with the exception of the magnesium salt, chloride or sulphate. It is seen that the oxychloride cement in the dry condition has somewhat higher strength than the oxysulphate cement. The wet strength of the oxychloride cement, taken upon samples thoroughly saturated with water, is roughly one-half of the dry strength, and the "recovered" strength upon drying the wet sample appreciably exceeds the original dry strength. In the case of the oxysulphate cement, on the other hand, the wet strength is only about one-fifth of the dry strength and the "recovered" strength only two-fifths of the original dry strength. It is clearly apparent from the foregoing that the great disparity in strength, under the conditions stated, of the simple oxysulphate, as compared with the oxychloride, cement more than offsets the other advantages which the former may possess. In view of the importance for certain purposes of obtaining a less hygroscopic magnesia cement than the oxychloride cements, such material being most readily supplied in an oxysulphate cement, a means of preventing, or counteracting, the loss in strength of the latter after immersion in water is greatly to be desired. It is the object of this invention to provide such means, said invention consisting of the combination of ingredients hereinafter fully described and particularly pointed out in the claims, the following description setting forth but a few of such combinations by way of illustration.

In a prior application filed March 24, 1928, Serial No. 264,575, I have disclosed the addition of certain beneficial substances, or strength promoters, in small amount to oxychloride cements, which substances have the effect of increasing the strength thereof as much as forty to fifty per cent, or more. I have also discovered that these same substances have a beneficial effect when added to oxysulphate cements, and, in fact, the improvement in some respects is relatively much greater. Particularly has it been observed that improvement in the wet and "recovered" strength of as high as three hundred per cent may be attained. As a further consequence thereof the "recovered" strength of such oxysulphate cements can be made to approach the original dry strength, and may equal or exceed it.

Among such beneficial substances are soluble salts of copper and zinc, the phosphates, arsenates, borates, chromates, molybdates of the alkali metals and ammonia, organic acids such as acetic, citric, tartaric, and the like, the salts of such acids, as well as combinations of two or more of the above named substances.

In my application Serial No. 303,977, filed September 4, 1928, I have claimed broadly a magnesium oxysulphate cement composition including a relatively small amount of a beneficial substance of the above character, and in the same application I have claimed specifically a composition wherein the beneficial substance is a soluble citrate, e. g. sodium citrate. In the present application, which is a division of the said application Serial No. 303,977, I desire to claim a magnesium oxysulphate cement composition which includes a relatively small amount of a soluble phosphate as a beneficial additive ingredient.

As examples of magnesium oxysulphate cement mixtures containing a soluble phosphate in small amount as a beneficial ingredient several compositions are given in Table II following, such tabulation also including figures to show the strength of the wet, dry, and "recovered" samples as given by the modulus of rupture expressed in pounds per square inch. For purposes of comparison the corresponding figures for samples prepared without the addition of a beneficial substance are also included. The several compositions were made up by combining a dry mixture, consisting of 15 parts plastic magnesia, 10 parts silex, 73 parts sand, 2 parts short fiber asbestos, by weight, with a sufficient amount of a gaging liquid comprising a magnesium sulphate solution of approximately 22° to 32° Bé. strength to give a wet mix of the proper consistency.

The actual quantity of magnesium sulphate solution used was such that the ratio of magnesium sulphate ($MgSO_4.7H_2O$) to plastic magnesia, by weight, in the resulting mix was between 1.07 and 1.12. The beneficial substance, e. g. disodium phosphate, was dissolved in the magnesium sulphate solution in amount of from 1 to 3 per cent., by weight, of the magnesium sulphate present.

In the dry mixture the active ingredient is plastic magnesia, the latter being a special prepared grade of calcined magnesium oxide suitable for making magnesia cement mixtures. The other ingredients of the dry mix mentioned are employed as fillers. Since there is more or less variation in the strength of such cements depending upon the particular plastic magnesia employed examples are giving using magnesia from different sources referred to as plastic magnesia A, B, C, and D, respectively.

Table II

| | Modulus of rupture—lb./sq. in. | | |
| --- | --- | --- | --- |
| | Wet | Dry | "Recovered" |
| PLASTIC MAGNESIA A | | | |
| No added substance | 212 | 1461 | 637 |
| 1% disodium phosphate $Na_2HPO_4.12H_2O$ | 520 | 1345 | 1114 |
| PLASTIC MAGNESIA B | | | |
| No added substance | 149 | 1221 | 490 |
| 1% disodium phosphate | 627 | 1342 | 1113 |
| PLASTIC MAGNESIA C | | | |
| No added substance | No strength | 1408 | No strength |
| 1% disodium phosphate | 344 | 1524 | 799 |
| 2% disodium phosphate | 720 | 1348 | 994 |
| PLASTIC MAGNESIA D | | | |
| No added substance | 236 | 1129 | 480 |
| 3% disodium phosphate | 494 | 1332 | 1085 |
| 1% diammonium phosphate | 225 | 1295 | 901 |

In the table the specimens marked "wet" were immersed for twenty-four hours in water on the 14th, 16th, and 18th days after making. They were then tested on the 19th day. The "recovered" specimens were treated exactly in the same way except that they were not tested until the 21st day at which time they had been allowed to dry for two days. The "dry" specimens were tested on the 20th day, to afford a fair comparison as to aging between the tests on the 19th and 21st days, respectively, of other specimens. These tests were made in accordance with the standard procedure for testing magnesia cements.

The significance of the figures is at once apparent, and clearly demonstrates the improved strength imparted to the magnesium oxysulphate cement mixture by the addition of a relatively small amount of the beneficial substance. In fact, the improvement thereby attained is such as to render the use of the aforementioned oxysulphate cements commercially practicable, and constitutes an important advance in the art.

In practice it will be found that there may be a wide variation in the strength of both oxychloride and oxysulphate cements dependent upon the source from which the magnesia is obtained, the temperature at which it is calcined, and other factors. In fact, there will be some variation in mixtures containing magnesia obtained from the same lot or source. The foregoing figures given in the examples are to be regarded, therefore, as representative only of mixtures made up using a good grade of plastic magnesia, and it will be understood that such figures may not necessarily be duplicated using materials from different sources.

The beneficial substances may be added in various ways, such as (1) dissolved in the magnesium sulphate solution used for gaging the dry mixture; or (2) incorporated with the other dry ingredients of the cement mixture. The precise manner of introducing the beneficial substances is not essential for the purpose of the invention, as in practice this may be done in any convenient manner.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A plastic cement composition which consists of magnesia, magnesium sulphate, and water as active ingredients, together with a relatively small amount of a soluble phosphate intimately incorporated therewith.

2. A plastic cement composition which includes as active ingredients magnesia, magnesium sulphate and water, together with a a relatively small amount of sodium phosphate intimately incorporated therewith.

3. A plastic cement composition which includes as active ingredients magnesia, magnesium sulphate and water, together with from 1 to 3 per cent of sodium phosphate ($Na_2HPO_4.12H_2O$), based upon the weight of magnesium sulphate ($MgSO_4.7H_2O$), intimately incorporated therewith.

4. A cement composition consisting of the active ingredients magnesia and magnesium sulphate, together with a relatively small amount of a soluble phosphate and a filler, and adapted to set upon admixing with water.

5. A cement composition comprising the primary ingredients magnesia and magnesium sulphate, together with a relatively small amount of sodium phosphate and a filler, and adapted to set upon admixing with water.

6. A gaging composition suitable for incorporating in a magnesia cement, said composition comprising magnesium sulphate and a relatively small amount of a soluble phosphate.

7. An ingredient suitable for incorporating in a magnesia cement, said ingredient comprising magnesium sulphate and a relatively small amount of sodium phosphate.

8. A cement composition consisting of a mixture of magnesia and magnesium sulphate, together with a relatively small amount of a soluble phosphate, and adapted to set upon admixing with water.

9. A cement composition comprising a mixture of magnesia and magnesium sulphate, together with a relatively small amount of sodium phosphate, and adapted to set upon admixing with water.

Signed by me this 8th day of October, 1929.

LEROY C. STEWART.